United States Patent
Oiwa

(10) Patent No.: US 8,146,464 B2
(45) Date of Patent: Apr. 3, 2012

(54) MACHINE TOOL AND WORKPIECE INNER SURFACE MACHINING METHOD USING THE MACHINE TOOL

(75) Inventor: Kazuhiko Oiwa, Yamatokoriyama (JP)

(73) Assignee: Mori Seiki Co., Ltd., Yamatokoriyama-shi, Nara-ken (JP)

( * ) Notice: Subject to any disclaimer, the term of this patent is extended or adjusted under 35 U.S.C. 154(b) by 609 days.

(21) Appl. No.: 12/392,826

(22) Filed: Feb. 25, 2009

(65) Prior Publication Data

US 2009/0217792 A1 Sep. 3, 2009

(30) Foreign Application Priority Data

Feb. 26, 2008 (JP) ................................. 2008-044180

(51) Int. Cl.
*B23B 1/00* (2006.01)
*B23B 5/40* (2006.01)
(52) U.S. Cl. .......................................... 82/1.11; 82/1.2
(58) Field of Classification Search ............... 82/1.11, 82/1.2, 1.4, 1.5, 131, 63, 86
See application file for complete search history.

(56) References Cited

U.S. PATENT DOCUMENTS

| | | | | |
|---|---|---|---|---|
| 4,487,275 A | * | 12/1984 | Froehlich | 175/170 |
| 5,209,145 A | * | 5/1993 | Baudermann | 82/1.5 |
| 5,967,007 A | * | 10/1999 | Scheer | 82/1.5 |
| 6,318,220 B1 | * | 11/2001 | Erdel | 82/1.11 |
| 8,015,902 B2 | * | 9/2011 | Hyatt et al. | 82/1.11 |

* cited by examiner

*Primary Examiner* — Will Fridie, Jr.
(74) *Attorney, Agent, or Firm* — Smith Patent Office

(57) ABSTRACT

To provide a machine tool not only capable of machining an inner surface of a workpiece into a spherical surface but also capable of machining a bearing surface including a flat surface and machining the combination of a spherical surface and a flat surface, and to provide a workpiece inner surface machining method using the machine tool. A machine tool includes: a workpiece holding mechanism 3 holding the workpiece 21; a tool 20 having a supporting member 22 and a cutting tool 23 which is supported to be pivotable about a pivot axis b located on a plane perpendicular to an axis a of the supporting member 22 and has a cutting edge 23a at least at one end; an axial feed mechanism 6a rotating the supporting member 22 about the axis a and moving the supporting member 22 in a direction of the axis a; a pivot driving mechanism 31 pivoting the cutting tool 23 about the pivot axis b; and a machining control mechanism controlling a pivot angle θ of the cutting tool 23 decided by the pivot driving mechanism 31 and a rotation speed and a position in the axis a direction of the supporting member 22 decided by the axial feed mechanism 6a, so as to make a machining point P by the cutting edge 23a move along a desired machining line.

18 Claims, 7 Drawing Sheets

FRONT SIDE OF MACHINE

MACHINE TOOL AND WORKPIECE INNER SURFACE MACHINING METHOD USING THE MACHINE TOOL

BACKGROUND OF THE INVENTION

1. Field of the Invention

The present invention relates to a machine tool machining an inner surface to be machined located on an inner surface of a workpiece or/and an outer surface to be machined located on an outer surface thereof, and to a workpiece inner surface machining method using the machine tool, more particularly, to improvement in the machining method when the inner surface (surface to be machined) is a spherical surface or a flat surface.

2. Description of the Related Art

As a conventional machine tool machining a spherical surface to be machined such as, for example, an inner surface of a differential gear case of an automobile, there is one described in U.S. Pat. No. 6,318,220B1, for instance. This machine tool uses a tool having a supporting member and a bar-shaped cutting tool supported by the supporting member to be pivotable about a pivot axis orthogonal to an axis of the supporting member. The cutting tool has cutting edges at its one end and another end and is pivotally supported so as to eject/retract from/into the supporting member. At the time of the machining, the tool is inserted into a workpiece while the cutting tool is held at a retracted position, and the cutting tool is pivoted about the pivot axis, so that the cutting edges cut the inner surface of the workpiece into an arcuate shape. Subsequently, the supporting member is slightly rotated about its axis and the cutting tool is pivoted again about the pivot axis. By repeating this operation, the inner surface of the workpiece is machined into a spherical shape.

The machining method described in the aforesaid U.S. Pat. No. 6,318,220B1 is capable of machining the inner surface of the workpiece into the spherical shape, but is not capable of machining a bearing surface which includes a flat surface orthogonal to the axis of the supporting member. Another tool is used to machine the bearing surface.

SUMMARY OF THE INVENTION

The present invention was made in consideration of the above-described conventional circumstances, and an object thereof is to provide a machine tool not only capable of machining an inner surface of a workpiece into a spherical shape but also capable of machining a bearing surface including a flat surface and machining the combination of a spherical surface and a flat surface, and to provide a workpiece inner surface machining method using the machine tool.

The first invention is a machine tool machining a surface to be machined located on an inner surface of a workpiece, the machine tool including: a workpiece holding mechanism fixedly holding the workpiece; a tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; and a machining control mechanism controlling a pivot angle of the cutting tool decided by the pivot driving mechanism and a rotation speed and an axial-direction position of the supporting member decided by the axial feed mechanism, so as to make a machining point by the cutting edge move along a desired machining line.

The second invention is a machine tool machining a surface to be machined located on an inner surface of a workpiece, the machine tool including: a tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; a workpiece driving mechanism rotating the workpiece about the axis; and a machining control mechanism controlling a pivot angle of the cutting tool decided by the pivot driving mechanism and a rotation speed and an axial-direction position of the supporting member decided by the axial feed mechanism so as to set a machining point by the cutting edge at a desired position, and causing the workpiece driving mechanism to rotate the workpiece.

The first embodiment of the first and second inventions is the machine tool, wherein: the surface to be machined is a flat surface perpendicular to the axis of the supporting member; and the machining control mechanism changes the pivot angle of the cutting tool and accordingly changes the axial-direction position of the supporting member.

The second embodiment of the first and second inventions is the machine tool, wherein: the surface to be machined is a spherical surface whose center is located on the pivot axis of the cutting tool; and the machining control mechanism changes only the pivot angle of the cutting tool and fixing the axial-direction position.

The third embodiment of the first and second inventions is the machine tool, wherein: the surface to be machined has a flat surface portion perpendicular to the axis of the supporting member and a spherical surface portion which is formed continuously from an outer edge portion of the flat surface portion and whose center is located on the pivot axis of the cutting tool; and at the time of the machining of the flat surface portion, the machining control mechanism changes the pivot angle of the cutting tool and accordingly changes the axial-direction position of the supporting member, and at the time of the machining of the spherical surface portion, changes only the pivot angle of the cutting tool and fixes the axial-direction position.

The third invention is a workpiece inner surface machining method of machining a surface to be machined located on an inner surface of a workpiece by a machine tool which includes: a workpiece holding mechanism holding the workpiece; a tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; and a machining control mechanism controlling a pivot angle of the cutting tool decided by the pivot driving mechanism and a rotation speed and an axial-direction position of the supporting member decided by the axial feed mechanism, so as to make a machining point by the cutting edge move along a desired machining line, the method including: a first step of causing the workpiece holding mechanism to fixedly hold the workpiece; a second step of causing the axial feed mechanism and the pivot driving mechanism to support the tool; a third step of inserting the tool into the workpiece and positioning the tool at a machining start position; and a fourth step of controlling the pivot angle of the cutting tool decided by the pivot driving mechanism and the rotation speed and the axial-direction position of the supporting member decided by the axial feed mechanism, so as to make the machining point by the cutting edge of the cutting tool move along the desired machining line.

The fourth invention is a workpiece inner surface machining method of machining a surface to be machined located on an inner surface of a workpiece by a machine tool which includes: a tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; a workpiece driving mechanism rotating the workpiece about the axis; and a machining control mechanism controlling a pivot angle of the cutting tool decided by the pivot driving mechanism and a rotation speed and an axial-direction position of the supporting member decided by the axial feed mechanism so as to set a machining point by the cutting edge at a desired position, and causing the workpiece driving mechanism to rotate the workpiece, the method including: a first step of causing the workpiece driving mechanism to hold the workpiece in a rotatable manner about the axis; a second step of causing the axial feed mechanism and the pivot driving mechanism to support the tool; a third step of inserting the tool into the workpiece to position the tool at a machining start position; and a fourth step of controlling the pivot angle of the cutting tool decided by the pivot driving mechanism and the rotation speed and the axial-direction position of the supporting member decided by the axial feed mechanism so as to set the machining point by the cutting edge of the cutting tool at the desired position, and rotating the workpiece.

The first embodiment of the third and fourth inventions is the workpiece inner surface machining method, wherein, when the surface to be machined is a flat surface perpendicular to the axis of the supporting member, the machining control mechanism, in the fourth step, changes the pivot angle of the cutting tool and accordingly changes the axial-direction position of the supporting member.

The second embodiment of the third and fourth inventions is the workpiece inner surface machining method, wherein, when the surface to be machined is a spherical surface whose center is located on the pivot axis of the cutting tool, the machining control mechanism, in the fourth step, changes only the pivot angle of the cutting tool and fixes the axial-direction position of the cutting tool.

The third embodiment of the third and fourth inventions is the workpiece inner surface machining method, wherein, when the surface to be machined has a flat surface portion perpendicular to the axis of the supporting member and a spherical surface portion which is formed continuously from an outer edge portion of the flat surface portion and whose center is located on the pivot axis of the cutting tool, the machining control mechanism, in the fourth step, changes the pivot angle of the cutting tool and accordingly changes the axial-direction position of the supporting member at the time of the machining of the flat surface portion, and changes only the pivot angle of the cutting tool and fixes the axial-direction position at the time of the machining of the spherical surface portion.

The fifth invention is a machine tool machining an inner surface to be machined located on an inner surface of a workpiece and an outer surface to be machined located on an outer surface of the workpiece, the machine tool including: an inner tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; a workpiece driving mechanism rotating the workpiece about the axis; an outer tool machining the outer surface to be machined of the workpiece; an inner machining control mechanism controlling a pivot angle of the cutting tool decided by the pivot driving mechanism and a rotation speed and an axial-direction position of the supporting member decided by the axial feed mechanism, so as to make a machining point by the cutting edge move along a desired machining line; and an outer machining control mechanism causing the workpiece driving mechanism to rotate the workpiece and controlling a depth of cut by the outer tool.

The sixth invention is a machine tool machining an inner surface to be machined located on an inner surface of a workpiece and an outer surface to be machined located on an outer surface of the workpiece, the machine tool including: an inner tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; a workpiece driving mechanism rotating the workpiece about the axis; an outer tool machining the outer surface to be machined of the workpiece; an inner machining control mechanism controlling a pivot angle of the cutting tool decided by the pivot driving mechanism and a rotation speed and an axial-direction position of the supporting member decided by the axial feed mechanism, so as to set a machining point by the cutting edge at a desired position; and an outer machining control mechanism causing the workpiece driving mechanism to rotate the workpiece and controlling a depth of cut by the outer tool.

According to the first and third inventions, the axial feed mechanism which rotates the supporting member supporting the cutting tool about the axis and moves the supporting member in the axial direction and the pivot driving mechanism which pivots the cutting tool about the pivot axis are provided, and as the pivot angle of the cutting tool is changed, the axial-direction position of the supporting member, and as a result, of the cutting tool is changed. This makes it possible to move the machining point along the desired machining line, enabling easy, reliable, and precise machining not only when the surface to be machined is a spherical surface but also when it is a flat surface.

According to the second and fourth inventions, the pivot angle of the cutting tool and the axial-direction position of the supporting member and, as a result, of the cutting tool is changed so that the machining point of the cutting tool is set at a desired position, and the workpiece is rotated about the axis of the supporting member. This enables easy, reliable, and precise machining not only when the surface to be machined is a spherical surface but also when it is a flat surface, similarly to claims 1, 6.

According to the first embodiment of the first to fourth inventions, the axial-direction position of the supporting member is changed as the pivot angle of the cutting tool is changed. This enables reliable machining even when the surface to be machined is a bearing surface or the like which is a flat surface perpendicular to the axis of the supporting member.

According to the second embodiment of the first to fourth inventions, only the pivot angle of the cutting tool is changed and the axial-direction position is fixed. This enables reliable machining even when the surface to be machined is a spherical surface whose center is located on the pivot axis of the cutting tool.

According to the third embodiment of the first to fourth inventions, the axial-direction position of the supporting member is changed as the pivot angle of the cutting tool is changed, or only the pivot angle of the cutting tool is changed. This enables reliable machining even when the surface to be machined has the flat surface portion and the spherical surface portion which is formed continuously from the outer edge portion of the flat surface portion.

According to the fifth and sixth inventions, the workpiece is rotary driven, and at the same time, the inner surface to be machined of the workpiece is cut by the cutting edge of the inner tool, and the outer surface to be machined of the workpiece is cut by the outer tool. This enables simultaneous machining of the inner surface to be machined and the outer surface to be machined of the workpiece.

In this case, appropriate combination of the rotation speed and rotation direction of the workpiece and the rotation speed and rotation direction of the inner tool enables various kinds of machining. For example, when 500 rpm is appropriate for machining the outer surface to be machined and 1000 rpm is appropriate for machining the inner surface to be machined, the combination of the 500 rpm rotation of the workpiece and 500 rpm reverse rotation of the inner tool can realize the simultaneous machining of the inner surface to be machined and the outer surface to be machined.

DETAILED DESCRIPTION OF THE PREFERRED EMBODIMENT

Figure 1:
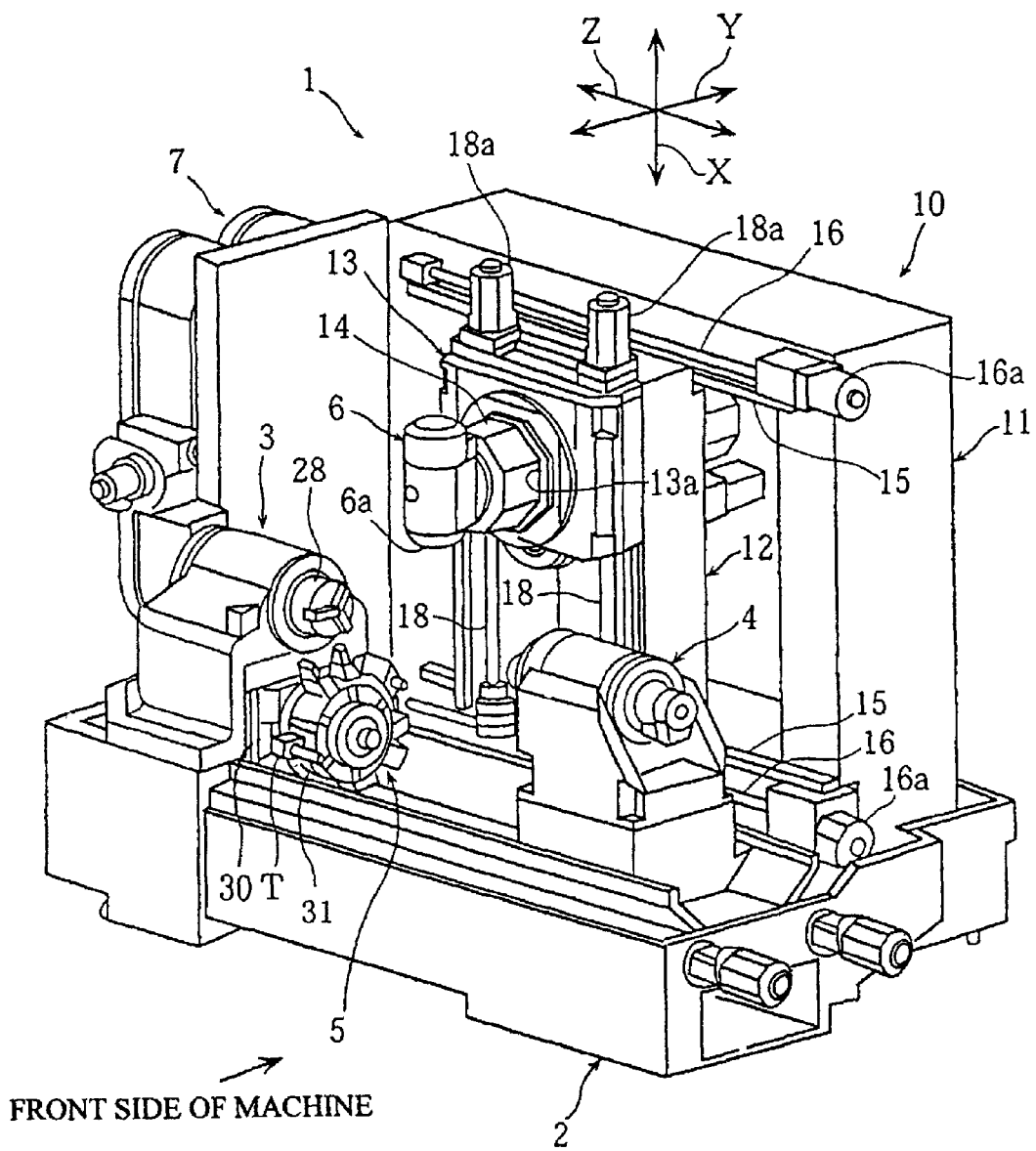
FIG. 1 is a perspective view of a composite lathe for carrying out a workpiece machining method according to an embodiment of the present invention.
Figure 2:
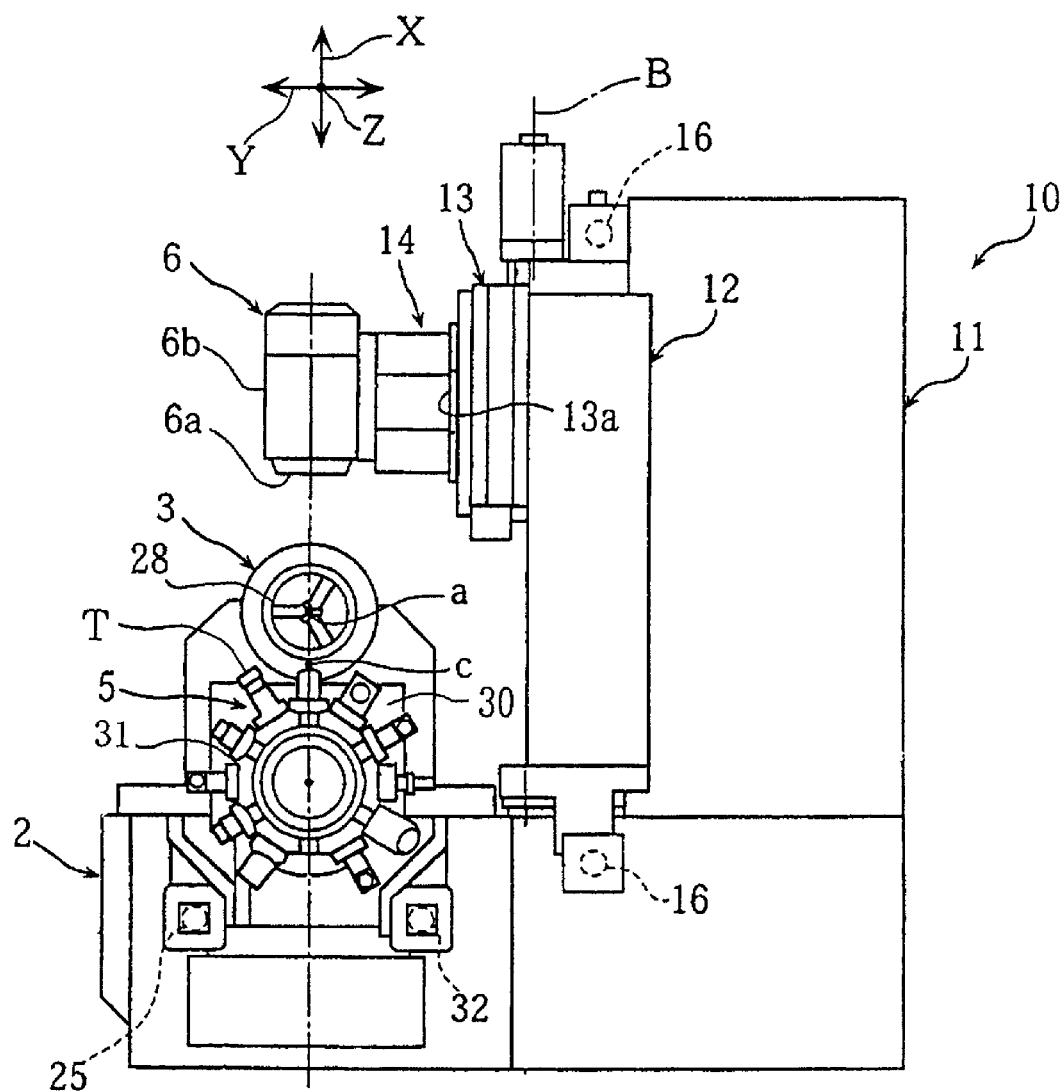
FIG. 2 is a right side view of the composite lathe.

Hereinafter, an embodiment of the present invention will be described with reference to the attached drawings.

FIG. 1 to FIG. 7 are views used to explain a machine tool and a workpiece inner surface machining method according to an embodiment of the present invention. In this embodiment, front, rear, left, and right refer to front, rear, left, and right in a state where the machine tool is viewed from its front surface side (state shown in FIG. 1).

In these drawings, reference numeral 1 denotes a composite lathe. The composite lathe 1 includes a bed 2, a first spindle headstock 3 disposed on a left end portion of the bed 2, a second spindle headstock 4 disposed on a right side of the first spindle headstock 3 coaxially with the first spindle headstock 3 to be movable in a Z-axis (right and left) direction, a tool post 5 disposed between the first and second spindle headstocks 3, 4 to be movable in an X-axis (up and down) direction and the Z-axis direction, and a third spindle 6 disposed on the bed 2 to be movable in the X-axis, Y-axis (back and forth), and Z-axis directions. On a rear side of the left end portion of the bed 2, a tool changer 7 automatically changing a preceding process tool and a subsequent process tool attached to the third spindle 6 is disposed.

On a front portion of the bed 2, the first spindle headstock 3, the tool post 5, and the second spindle headstock 4 are disposed, and on a rear portion thereof, a supporting mechanism 10 movably supporting the third spindle 6 is mounted. The supporting mechanism 10 includes a rectangular frame-shaped column 11 fixed to extend vertically upward from the rear portion of the bed 2, a rectangular frame-shaped saddle 12 supported on a front surface of the column 11 to be movable in the Z-axis direction, a cross slide 13 supported on a front surface of the saddle 12 to be movable in the X-axis direction, and a ram 14 supported by the cross slide 13 to be movable in the Y-axis direction and supporting the third spindle 6.

The saddle 12 is supported by a pair of upper and lower Z-axis guide rails 15, 15 disposed on the front surface of the column 11 in parallel with the Z-axis to be movable in the Z-axis direction and is driven to reciprocate in the Z-axis direction when Z-axis ball screws 16, 16 are rotary driven by servomotors 16a, 16a.

The cross slide 13 is driven to reciprocate in the X-axis direction when X-axis ball screws screwed into nut portions which are formed on left and right side portions of the cross slide 13 are rotary driven by servomotors 18a, 18a.

The ram 14 is inserted in a ram guide hole 13a formed in the cross slide 13 and is supported by guide plates (not shown), which are arranged on an inner peripheral surface of the ram guide hole 13a at predetermined angular intervals, to be movable in the Y-axis direction. The ram 14 is driven to reciprocate in the Y-axis direction when one Y-axis ball screw disposed on a widthwise center lower portion of the cross slide 13 is rotary driven by a servomotor.

The third spindle 6 is rotatably inserted in the ram 14. At a tip of the third spindle 6, a tool spindle 6a is disposed with its axis set orthogonal to the Y axis, to be rotary indexable about the axis of the third spindle 6.

The tool post 5 has a turret 31 having a large number of tools T attached to its outer peripheral edge. The turret 31 is supported by a supporting member 30 to be movable in the X-axis direction and the Z-axis direction. Further, the turret 31 is indexable so that a cutting edge c of a desired one of the tools T is located at a position vertically under an axis a of the first spindle headstock 3. 25, 32 denote Z-axis direction feed screws.

Between the tool spindle 6a and the first spindle headstock 3, a tool (inner tool) 20 for carrying out a workpiece machining method of this embodiment is mounted. Before the tool 20 is mounted, the position of the tool spindle 6a is controlled so that an axis of the tool 20 becomes horizontal and coaxial with the axis of the first spindle headstock 3, and in this state, the tool 20 is mounted. By using the tool 20, the composite lathe 1 according to this embodiment is capable of machining surfaces to be machined such as, for example, a spherical surface portion and a flat bearing surface of an inner surface of, for example, a differential gear case 21 constituting an outer shell of a differential gear of an automobile.

The tool 20 includes a supporting member 22 and a cutting tool 23 supported to be pivotable about a pivot axis b located on a plane b' perpendicular to an axis a of the supporting member 22 in a plane view. The pivot axis b may be apart from the axis a or may intersect with the axis a. The supporting member 22 has a round rod shape and has on its right end portion a holder portion 22a gripped by a tool changer or the like, and its tapered mating portion 22b formed continuously from the holder portion 22a is fixedly mated with a mating hole 6b of the tool spindle 6a.

At a substantially axial center portion of the supporting member 22, a housing/support portion 22c supporting the cutting tool 23 in a housed state is formed in a slit shape. The cutting tool 23 is disposed in the housing/support portion 22c and is pivotally supported by a support shaft 19 coaxially arranged with the pivot axis b. A chip (cutting edge) 23a is bolted to a tip of the cutting tool 23, and a contact point where a tip of the chip 23a comes into contact with a surface to be machined is a machining point P.

Further, the supporting member 22 has a left end portion 22e supported by a chuck 28 of the first spindle headstock 3 via a rotary bush 37 and is rotatable and movable in an axial direction. Further, in a left portion of the supporting member 22, a linear support hole 22d is formed coaxially with the axis a so as to communicate with the housing/support portion 22c. In the support hole 22d, a drive shaft 24 is disposed to be slidable in the axial direction. A rear end portion 25a of a link member 25 is coupled to a right end portion 24a of the drive shaft 24 via a coupling pin 25a'. Further, a tip portion 25b of the link member 25 is coupled to the cutting tool 23 via a coupling pin 25b'. The coupling pin 25b' is located at a position deviated from the pivot axis b of the cutting tool 23. Further, the cutting tool 23 has a slit 23c which is formed at its portion facing the link member 25 to avoid the interference with the link member 25, and a front portion of the link member 25 is located in the slit 23c. The cutting tool 23 pivots about the pivot axis b according to forward or backward movement of the drive shaft 24.

A left portion of the drive shaft 24 has a small diameter, and a guide plate 24c and an end plate 24d are bolted to a left end surface of this small-diameter portion 24b. On the small-diameter portion 24b, a biasing spring 26 is interposed between the guide plate 24c and a stepped portion of the support hole 22d to bias the drive shaft 24 leftward in the drawing. Further, a guide pin 27 is buried in the support hole 22d portion of the supporting member 22. A tip portion 27a of the guide pin 27 is slidably mated with a guide groove 24e formed in a groove shape in the supporting member 22, whereby the drive shaft 24 rotates with the supporting member 22 and independently moves in the axial direction.

A taper portion 29a at a tip of a pusher 29 is engaged with an engagement hole formed in an axis portion of the end plate 24d. The pusher 29 is disposed in a draw pipe 3b, which is disposed in the first spindle headstock 3, via a bearing 29b to be rotatable and slidable in the axial direction. The draw pipe 3b is disposed in a first spindle 3a disposed in the first spindle headstock 3 and a chuck-cylinder 30a is connected to a left end portion of the draw pipe 3b.

A pusher driving mechanism 31 is connected to a left end portion of the pusher 29. The pusher driving mechanism 31 has a driving member 32 supporting the left end portion of the pusher 29 by a bearing 32a so as to allow the pusher 20 to rotate and move in the axial direction, a ball screw 33 screwed into a nut member 32b fixed to the driving member 32, and a servomotor 34 coupled to the ball screw 33 via a coupling 34a. Front and rear end portions of the ball screw 33 are supported by a base member 36 via bearings 35a, 35a.

The pusher driving mechanism 31 functions as a pivot driving mechanism moving the pusher 29 back and forth by the rotation of the servomotor 34, thereby pivoting the cutting tool 23 via the drive shaft 24 and the link member 25.

Further, the chuck 28 of the first spindle headstock 3 of the composite lathe 1 functions as a workpiece holding mechanism positioning and holding a flange portion 21c of the differential gear case 21. The tool spindle 6a functions as an axial feed mechanism rotating the tool 20 about its axis a and controlling the axial-direction (Z-axis direction) position of the tool 20. Here, the operation of the pusher driving mechanism 31 and the operation of the third spindle 6, that is, of the tool spindle 6a are realized by a controller (not shown) provided in the composite lathe 1. That is, a controller for dedicated control for realizing the present invention is not necessary.

The differential gear case 21 as an object to be machined has left and right boss portions 21a, 21b and the flange portion 21c, and left and right through holes 21a', 21b' are formed in the left and right boss portions 21a, 21b. As surfaces to be machined, the differential gear case 21 further has, on its inner surface, a spherical surface portion m1 in a spherical shape, and a right bearing surface m2 and a left bearing surface m3 which are flat surfaces perpendicular to the axis a.

First, the operations when the right bearing surface m2 is machined will be described.

[First Step]

Figure 3:
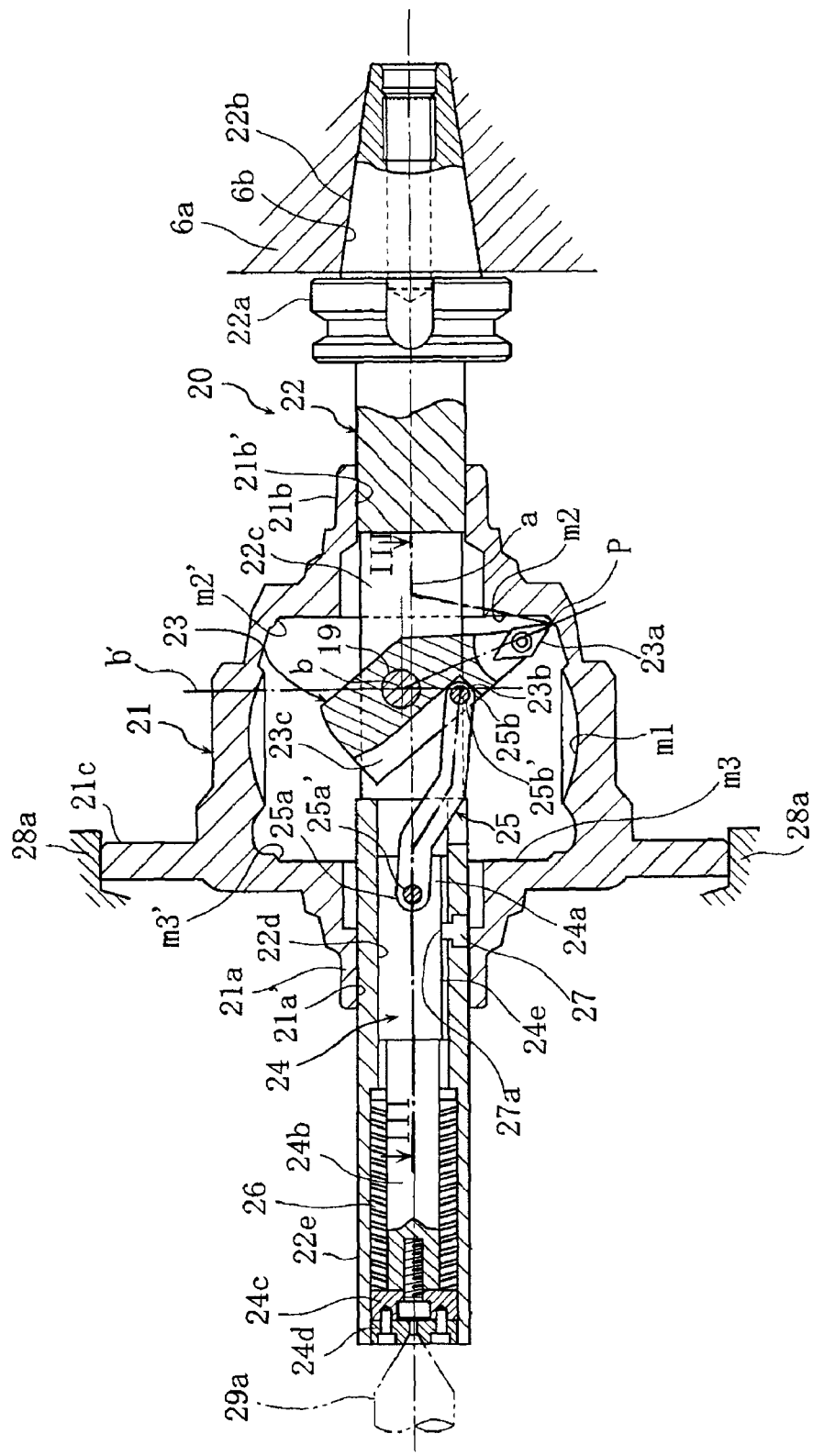
FIG. 3 is a side sectional view of a tool used in the workpiece machining method.
Figure 4:
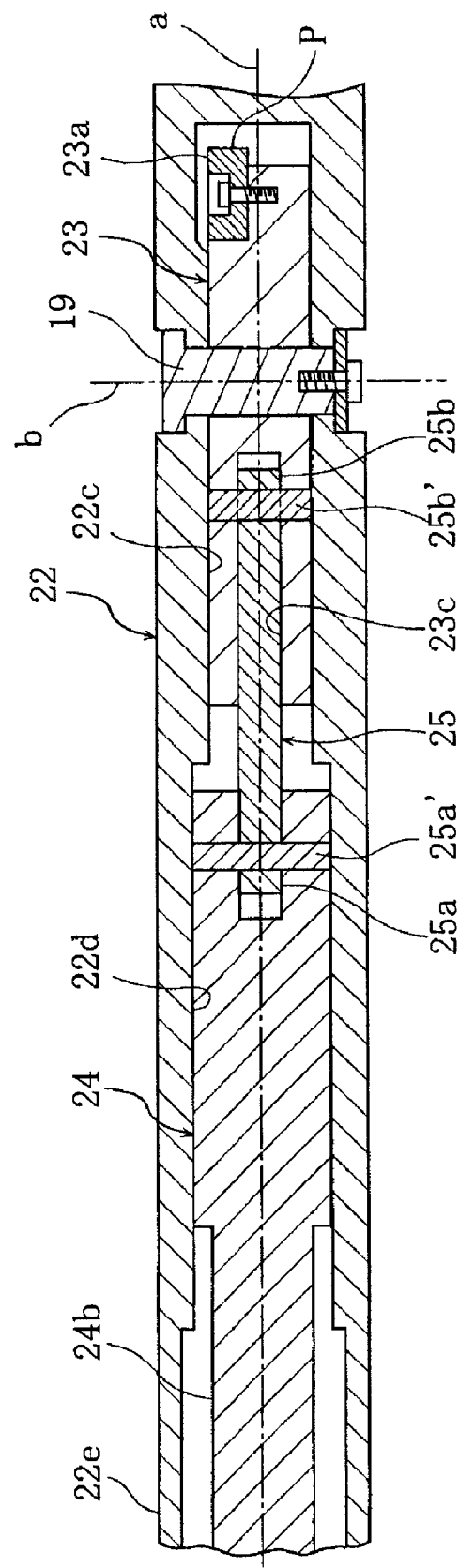
FIG. 4 is a plane sectional view of the tool (sectional view taken along IV-IV line in FIG. 3.
Figure 5:
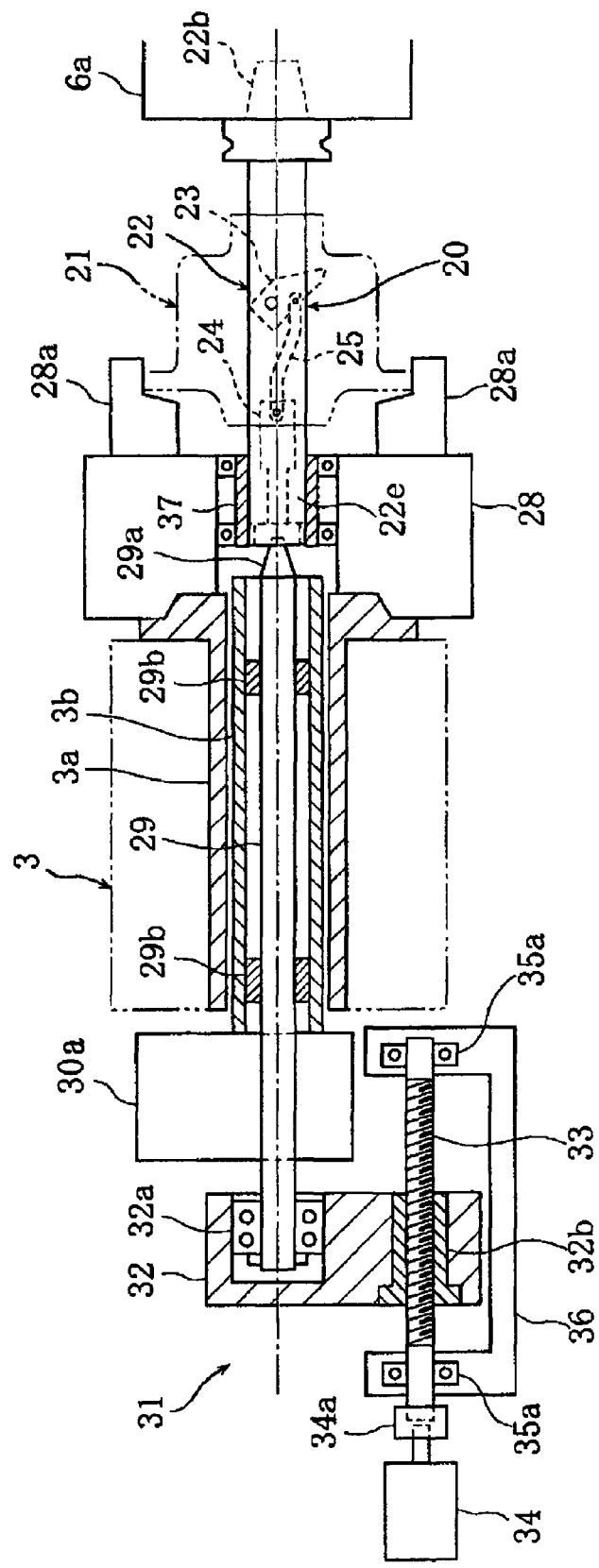
FIG. 5 is a schematic view showing the structure of a pusher driving mechanism for carrying out the workpiece machining method.
Figure 6:
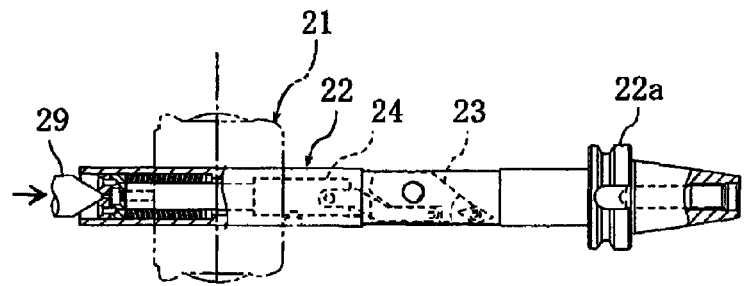
FIG. 6(a) to FIG. 6(d) are procedural views used to explain the workpiece machining method.
Figure 6:
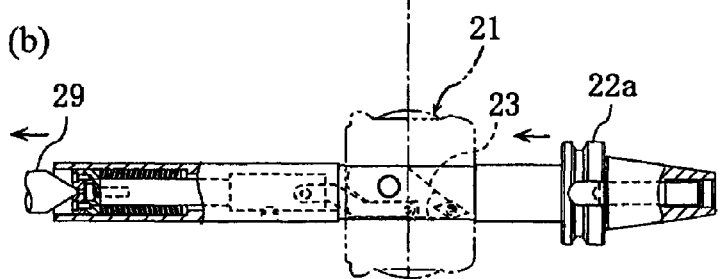
Figure 6:
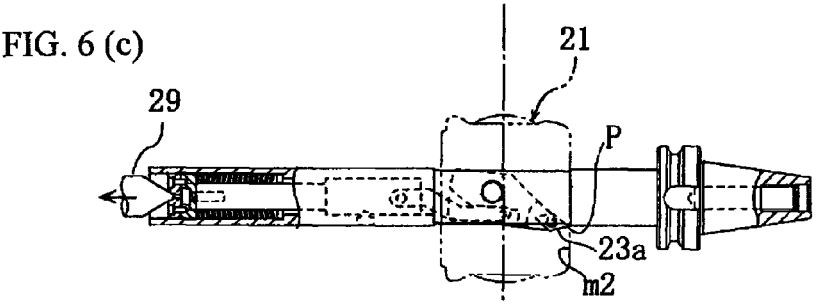
Figure 6:
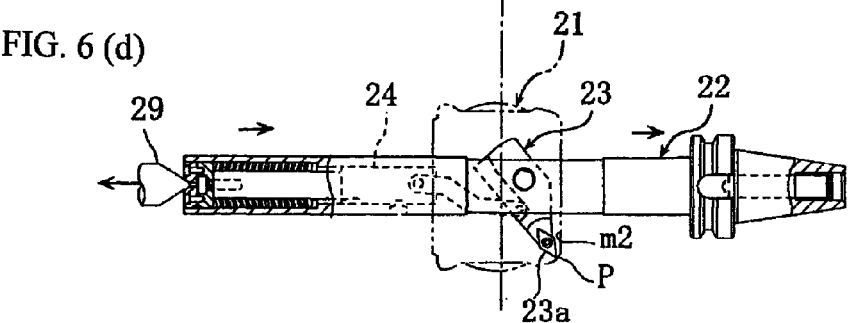

A claw 28a of the chuck 28 of the first spindle headstock 3 grips the flange portion 21c of the differential gear case 21 to hold the differential gear case 21 at a predetermined Z-axis direction position (see FIG. 3).

[Second Step]

The tool spindle 6a is rotated about the Y axis so as to be coaxial with the first spindle headstock 3 and its Y-axis direction and X-axis direction positions are controlled. In this state, the left portion of the supporting member 22 of the tool 20 is inserted through the through holes 21b', 21a' in the differential gear case 21 from the right, and the taper portion 22b at the right end of the tool 20 is mated with the mating hole 6b of the tool spindle 6a, and the left end portion 22e of the supporting member 22 is supported by the chuck 28 via the rotary bush 37 (see FIG. 5).

Then, the taper portion 29a of the pusher 29 is engaged with the engagement hole of the end plate 24d. Subsequently, the servomotor 34 of the pusher driving mechanism 31 is rotated to move the pusher 29 forward toward the differential gear case 21, whereby the cutting tool 23 is pivoted about the support shaft 19 to be retracted into the housing/support portion 22c of the supporting member 22 (see FIG. 6(a)).

[Third Step]

By the synchronization control by the pusher driving mechanism 31 and the tool spindle 6a, the pusher 29 and the supporting member 22 are moved leftward in synchronization, and the cutting tool 23 portion is made to enter the differential gear case 21 to be located at a machining start position (see FIG. 6(b)).

[Fourth Step]

Figure 7:
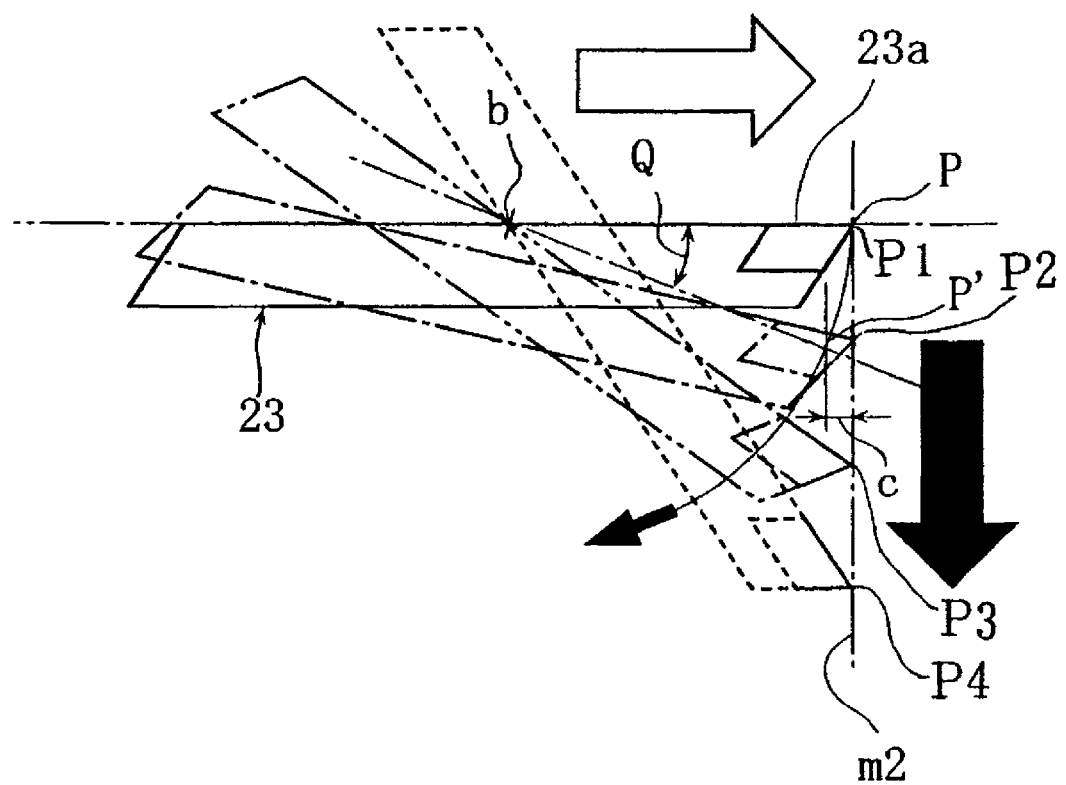
FIG. 7 is a schematic view used to explain the operation of a cutting tool of the workpiece machining method.

The positions of the drive shaft 24 and the supporting member 22 are controlled so that the chip 23a of the cutting tool 23 moves on the right bearing surface m2 along a machining line orthogonal to the axis a. Concretely, by the rotation control of the servomotor 34 of the pusher driving mechanism 31, the cutting tool 23 pivots about the support shaft 19. For example, as shown in FIG. 7, when a pivot angle increases by θ, the machining point P shifts in the Z-axis direction by c up to the position P', but in this embodiment, the Z-axis direction position of the tool spindle 6a is controlled so that the machining point P' moves rightward in the Z-axis direction by c simultaneously with the pivoting so as to coincide with the right bearing surface m2. Consequently, the machining point P moves linearly along the machining line on the right bearing surface m2 (see FIG. 6(d) and FIG. 7). In synchronization with the rightward movement of the tool spindle 6a, the pusher driving mechanism 31 moves the pusher 29 rightward so that the pivot angle of the cutting tool 23 is kept θ.

Then, when the machining for one machining line is finished, the tool spindle 6a slightly rotates the supporting member 22, and as a result, rotates the cutting tool 23, about the axis a, followed by the machining along a subsequent machining line. Repeating this operation realizes the machining of the right bearing surface m2 orthogonal to the axis a. The left bearing surface m3 is machined in the same manner.

In order to machine the spherical surface portion m1, in the fourth step, only the pivot angle of the cutting tool 23 is changed and the position in the direction of the axis a of the supporting member 22 is fixed. Consequently, the cutting tool 23 pivots about the pivot axis b to be capable of easily and surely machining the spherical surface portion m1.

Further, when the surface to be machined has not only the left and right bearing surfaces m2, m3 which are flat surfaces orthogonal to the axis a of the supporting member 22 but also spherical surface portions m2', m3' which are formed continuously from outer edge portions of the flat surface portions and whose centers are located on the support shaft 19 of the cutting tool 23, in the fourth step, the supporting member 22 is moved in the direction of the axis a in accordance with an increase in the pivot angle of the cutting tool 23 at the time of the machining of the flat surface portions, and only the pivot angle of the cutting tool 23 is changed and the position in the direction of the axis a is fixed at the time of the machining of the spherical surface portions m2', m3'.

As described above, in this embodiment, the tool spindle 6a moves the supporting member 22 rightward in accordance with the increase in the pivot angle θ of the cutting tool 23 so that the machining point P of the cutting tool 23 moves rightward, that is, moves toward the flat surface to be machined, which enables easy and sure machining even when the surface to be machined is a flat surface perpendicular to the axis a.

Further, in order to move the supporting member 22 in the Z-axis direction, a Z-axis moving function of the tool spindle 6a that a conventional composite lathe has is utilized, and therefore, the function of the existing composite lathe can be used to realize the machining of not only a spherical surface to be machined but also a flat bearing surface.

It should be noted that the present invention is also capable of adopting a cutting tool having cutting edges at both ends, though the case where the cutting tool has the cutting edge only at one end is described in the foregoing embodiment.

Further, in the present invention, an object to be machined may be fixed on the bed via a jig, though the case where the differential gear case 21 is held by the chuck 28 of the first spindle headstock 3 is described in the foregoing embodiment.

Further, in the foregoing embodiment, at the time of the machining of the inner surface, the differential gear case (workpiece) 21 is fixedly held, and the pivoting of the cutting tool 23 and the rotation of the support shaft 22 are controlled so that the machining point P of the chip 23a depicts a desired machining line. However, in the present invention, the differential gear case 21 may be rotary driven. In this case, the inner surface can be machined in such a manner that the pivot angle of the cutting tool 23 and the rotation angle and the axial-direction position of the supporting member 22 are controlled so that the machining point P of the chip 23a is located at a desired position, and in this state, the differential gear case 21 is rotated.

Concretely, the differential gear case 21 is gripped by the chuck 28 of the first spindle headstock 3, and, for example, in FIG. 7, the differential gear case 21 is rotated about the axis a while the machining point P is moved from P1 shown by the solid line to P2 shown by the chain line, to P3 shown by the two-dot chain line, and further to P4 shown by the broken line. This operation can realize the machining of a flat surface.

Furthermore, in the present invention, simultaneous machining of an outer surface to be machined located on an outer surface of a workpiece, concretely, the differential gear case 21 and an inner surface to be machined located on an inner surface thereof is possible. For example, the differential gear case 21 is gripped by the chuck 28 of the first spindle headstock 3 and at the same time is rotated at a required rotation speed in a required rotation direction. Then, a depth of cut by a desired outer tool T attached to the turret 31 is controlled, and the position of the machining point P of the inner tool 20, and its rotation speed and rotation direction are appropriately and selectively controlled, similarly to the embodiment described above.

In this case, in the present invention, the rotation speed for machining the outer surface to be machined of the workpiece and the rotation speed for machining its inner surface to be machined can be set equal or can be set to any different rotation speeds. That is, the rotation speed at the time of the machining of the outer surface to be machined is the rotation speed of the workpiece, and the rotation speed at the time of the machining of the inner surface to be machined is a relative speed between the rotation speed of the workpiece and the rotation speed of the supporting member 22, that is, of the inner tool 20.

For example, in a case where 500 rpm is suitable for machining the outer surface to be machined of the differential gear case 21 and 1000 rpm is suitable for machining its inner surface to be machined, the depth of cut by the outer tool T is controlled while the differential case 21 is rotated at 500 rpm. Further, as for the inner tool 20, the pivot angle of the cutting tool 23 and the axial-direction position of the supporting member 22 are controlled so that the machining point P is located at a desired position, and at the same time, the supporting member 22 is rotated at 500 rpm in the reverse direction to the aforesaid direction. This can realize the simultaneous machining of the inner surface to be machined and the outer surface to be machined of the differential gear case 21 at different rotation speeds.

Further, for example, in a case where 500 rpm is suitable for machining the outer surface to be machined of the differential gear case 21 and 300 rpm is suitable for machining its inner surface to be machined, the depth of cut by the outer tool T is controlled while the differential gear case 21 is rotated at 500 rpm. As for the inner tool 20, the supporting member 22 is rotated at 200 rpm in the same direction as the rotation direction of the differential gear case 21.

As described above, owing to the free selectability of the rotation speed for machining the outer surface to be machined and the rotation speed for machining the inner surface to be machined, the machining according to necessary machining speed or machining precision is enabled.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

This application is based on Japanese Patent Application No. 2008-044180 filed on Feb. 26, 2008, the contents of which are incorporated hereinto by reference.

What is claimed is:

1. A machine tool machining a surface to be machined located on an inner surface of a workpiece, the machine tool comprising:
    a workpiece holding mechanism fixedly holding the workpiece;
    a tool having a supporting member and a cutting tool which is supported to be pivotable about a pivot axis located on a plane perpendicular to an axis of the supporting member and has a cutting edge at least at one end;
    an axial feed mechanism rotating the supporting member about the axis and moving the supporting member in a direction of the axis;
    a pivot driving mechanism pivoting the cutting tool about the pivot axis; and
    a machining control mechanism controlling a pivot angle of the cutting tool decided by said pivot driving mechanism and a rotation speed and an axial-direction position of the supporting member decided by said axial feed mechanism, so as to make a machining point by the cutting edge move along a desired machining line.

2. A machine tool machining a surface to be machined located on an inner surface of a workpiece, the machine tool comprising:
    a tool having a supporting member and a cutting tool which is supported to be pivotable about a pivot axis located on a plane perpendicular to an axis of the supporting member and has a cutting edge at least at one end;
    an axial feed mechanism rotating the supporting member about the axis and moving the supporting member in a direction of the axis;
    a pivot driving mechanism pivoting the cutting tool about the pivot axis;
    a workpiece driving mechanism rotating the workpiece about the axis; and
    a machining control mechanism controlling a pivot angle of the cutting tool decided by said pivot driving mechanism and a rotation speed and an axial-direction position of the supporting member decided by said axial feed mechanism so as to set a machining point by the cutting edge at a desired position, and causing said workpiece driving mechanism to rotate the workpiece.

3. The machine tool according to claim 1, wherein:
    the surface to be machined is a flat surface perpendicular to the axis of the supporting member; and
    said machining control mechanism changes the pivot angle of the cutting tool and accordingly changes the axial-direction position of the supporting member.

4. The machine tool according to claim 1, wherein:
    the surface to be machined is a spherical surface whose center is located on the pivot axis of the cutting tool; and
    said machining control mechanism changes only the pivot angle of the cutting tool and fixes the axial-direction position.

5. The machine tool according to claim 1, wherein:
    the surface to be machined has a flat surface portion perpendicular to the axis of the supporting member and a spherical surface portion which is formed continuously from an outer edge portion of the flat surface portion and whose center is located on the pivot axis of the cutting tool; and
    at the time of the machining of the flat surface portion, said machining control mechanism changes the pivot angle of the cutting tool and accordingly changes the axial-direction position of the supporting member, and at the time of the machining of the spherical surface portion, changes only the pivot angle of the cutting tool and fixes the axial-direction position.

6. A workpiece inner surface machining method of machining a surface to be machined located on an inner surface of a workpiece by a machine tool which comprises: a workpiece holding mechanism holding the workpiece; a tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; and a machining control mechanism controlling a pivot angle of the cutting tool decided by the pivot driving mechanism and a rotation speed and an axial-direction position of the supporting member decided by the axial feed mechanism, so as to make a machining point by the cutting edge move along a desired machining line, the method comprising:
    a first step of causing the workpiece holding mechanism to fixedly hold the workpiece;
    a second step of causing the axial feed mechanism and the pivot driving mechanism to support the tool;
    a third step of inserting the tool into the workpiece and positioning the tool at a machining start position; and
    a fourth step of controlling the pivot angle of the cutting tool decided by the pivot driving mechanism and the rotation speed and the axial-direction position of the supporting member decided by the axial feed mechanism, so as to make the machining point by the cutting edge of the cutting tool move along the desired machining line.

7. A workpiece inner surface machining method of machining a surface to be machined located on an inner surface of a workpiece by a machine tool which comprises: a tool having a supporting member and a cutting tool which is supported to be pivotable about a pivot axis located on a plane perpendicular to an axis of the supporting member and has a cutting edge at least at one end; an axial feed mechanism rotating the supporting member about the axis and moving the supporting member in a direction of the axis; a pivot driving mechanism pivoting the cutting tool about the pivot axis; a workpiece driving mechanism rotating the workpiece about the axis; and a machining control mechanism controlling a pivot angle of the cutting tool decided by the pivot driving mechanism and a rotation speed and an axial-direction position of the supporting member decided by the axial feed mechanism so as to set a machining point by the cutting edge at a desired position, and causing the workpiece driving mechanism to rotate the workpiece, the method comprising:
    a first step of causing the workpiece driving mechanism to hold the workpiece in a rotatable manner about the axis;
    a second step of causing the axial feed mechanism and the pivot driving mechanism to support the tool;
    a third step of inserting the tool into the workpiece to position the tool at a machining start position; and
    a fourth step of controlling the pivot angle of the cutting tool decided by the pivot driving mechanism and the rotation speed and the axial-direction position of the supporting member decided by the axial feed mechanism so as to set the machining point by the cutting edge of the cutting tool at the desired position, and rotating the workpiece.

8. The workpiece inner surface machining method according to claim 6, wherein
    when the surface to be machined is a flat surface perpendicular to the axis of the supporting member, the machining control mechanism, in said fourth step, changes the pivot angle of the cutting tool and accordingly changes the axial-direction position of the supporting member.

9. The workpiece inner surface machining method according to claim 6, wherein
when the surface to be machined is a spherical surface whose center is located on the pivot axis of the cutting tool, the machining control mechanism, in said fourth step, changes only the pivot angle of the cutting tool and fixes the axial-direction position of the cutting tool.

10. The workpiece inner surface machining method according to claim 6, wherein
when the surface to be machined has a flat surface portion perpendicular to the axis of the supporting member and a spherical surface portion which is formed continuously from an outer edge portion of the flat surface portion and whose center is located on the pivot axis of the cutting tool, the machining control mechanism, in the fourth step, changes the pivot angle of the cutting tool and accordingly changes the axial-direction position of the supporting member at the time of the machining of the flat surface portion, and changes only the pivot angle of the cutting tool and fixes the axial-direction position at the time of the machining of the spherical surface portion.

11. A machine tool machining an inner surface to be machined located on an inner surface of a workpiece and an outer surface to be machined located on an outer surface of the workpiece, the machine tool comprising:
an inner tool having a supporting member and a cutting tool which is supported to be pivotable about a pivot axis located on a plane perpendicular to an axis of the supporting member and has a cutting edge at least at one end;
an axial feed mechanism rotating the supporting member about the axis and moving the supporting member in a direction of the axis;
a pivot driving mechanism pivoting the cutting tool about the pivot axis;
a workpiece driving mechanism rotating the workpiece about the axis;
an outer tool machining the outer surface to be machined of the workpiece;
an inner machining control mechanism controlling a pivot angle of the cutting tool decided by said pivot driving mechanism and a rotation speed and an axial-direction position of the supporting member decided by said axial feed mechanism, so as to make a machining point by the cutting edge move along a desired machining line; and
an outer machining control mechanism causing said workpiece driving mechanism to rotate the workpiece and controlling a depth of cut by said outer tool.

12. A machine tool machining an inner surface to be machined located on an inner surface of a workpiece and an outer surface to be machined located on an outer surface of the workpiece, the machine tool comprising:
an inner tool having a supporting member and a cutting tool which is supported to be pivotable about a pivot axis located on a plane perpendicular to an axis of the supporting member and has a cutting edge at least at one end;
an axial feed mechanism rotating the supporting member about the axis and moving the supporting member in a direction of the axis;
a pivot driving mechanism pivoting the cutting tool about the pivot axis;
a workpiece driving mechanism rotating the workpiece about the axis;
an outer tool machining the outer surface to be machined of the workpiece;
an inner machining control mechanism controlling a pivot angle of the cutting tool decided by said pivot driving mechanism and a rotation speed and an axial-direction position of the supporting member decided by said axial feed mechanism, so as to set a machining point by the cutting edge at a desired position; and
an outer machining control mechanism causing said workpiece driving mechanism to rotate the workpiece and controlling a depth of cut by said outer tool.

13. The machine tool according to claim 2, wherein:
the surface to be machined is a flat surface perpendicular to the axis of the supporting member; and
said machining control mechanism changes the pivot angle of the cutting tool and accordingly changes the axial-direction position of the supporting member.

14. The machine tool according to claim 2, wherein:
the surface to be machined is a spherical surface whose center is located on the pivot axis of the cutting tool; and
said machining control mechanism changes only the pivot angle of the cutting tool and fixes the axial-direction position.

15. The machine tool according to claim 2, wherein:
the surface to be machined has a flat surface portion perpendicular to the axis of the supporting member and a spherical surface portion which is formed continuously from an outer edge portion of the flat surface portion and whose center is located on the pivot axis of the cutting tool; and
at the time of the machining of the flat surface portion, said machining control mechanism changes the pivot angle of the cutting tool and accordingly changes the axial-direction position of the supporting member, and at the time of the machining of the spherical surface portion, changes only the pivot angle of the cutting tool and fixes the axial-direction position.

16. The workpiece inner surface machining method according to claim 7, wherein
when the surface to be machined is a flat surface perpendicular to the axis of the supporting member, the machining control mechanism, in said fourth step, changes the pivot angle of the cutting tool and accordingly changes the axial-direction position of the supporting member.

17. The workpiece inner surface machining method according to claim 7, wherein
when the surface to be machined is a spherical surface whose center is located on the pivot axis of the cutting tool, the machining control mechanism, in said fourth step, changes only the pivot angle of the cutting tool and fixes the axial-direction position of the cutting tool.

18. The workpiece inner surface machining method according to claim 7, wherein
when the surface to be machined has a flat surface portion perpendicular to the axis of the supporting member and a spherical surface portion which is formed continuously from an outer edge portion of the flat surface portion and whose center is located on the pivot axis of the cutting tool, the machining control mechanism, in the fourth step, changes the pivot angle of the cutting tool and accordingly changes the axial-direction position of the supporting member at the time of the machining of the flat surface portion, and changes only the pivot angle of the cutting tool and fixes the axial-direction position at the time of the machining of the spherical surface portion.

* * * * *